US006000630A

United States Patent [19]

Takenawa

[11] Patent Number: 6,000,630

[45] Date of Patent: Dec. 14, 1999

[54] EMULSION DISPERSING DEVICE AND METHOD

[75] Inventor: Toru Takenawa, Kawasaki, Japan

[73] Assignee: Niigata Engineering Co., Ltd., Tokyo, Japan

[21] Appl. No.: 09/026,971

[22] Filed: Feb. 20, 1998

[30] Foreign Application Priority Data

Feb. 24, 1997 [JP] Japan .................................... 9-055564

[51] Int. Cl.$^{6}$ ..................................................... A01G 25/09

[52] U.S. Cl. .......................... 239/156; 239/172; 239/566; 239/568; 239/159

[58] Field of Search ..................................... 239/155, 156, 239/159, 172, 176, 124, 127, 566, 568

[56] References Cited

U.S. PATENT DOCUMENTS

| | | | |
|---|---|---|---|
| 3,191,871 | 6/1965 | Palmer | 239/568 X |
| 3,782,634 | 1/1974 | Herman | 239/156 |
| 4,177,675 | 12/1979 | Friedenburg et al. | 239/156 X |
| 4,202,498 | 5/1980 | Lestradet | 239/156 |
| 4,878,578 | 11/1989 | Ruschhaupt, Jr. | 239/156 X |
| 5,014,914 | 5/1991 | Wallenas | 239/156 X |

FOREIGN PATENT DOCUMENTS

| | | | |
|---|---|---|---|
| 371 867 | of 0000 | Austria . | |
| 484 236 B1 | 3/1995 | European Pat. Off. . | |
| 26 664 918 | of 0000 | France . | |
| 32 25 645 A1 | of 0000 | Germany . | |
| 39 42 496 A1 | of 0000 | Germany . | |
| 91 00 824 | of 0000 | Germany . | |
| 10-18218 | 10/1998 | Japan . | |
| 2063517 | 6/1981 | United Kingdom | 239/156 |
| 9102599 | 3/1991 | WIPO | 239/156 |

*Primary Examiner*—Kevin Weldon

*Attorney, Agent, or Firm*—Pearne, Gordon, McCoy & Granger LLP

[57] ABSTRACT

A vehicle-mounted emulsion dispersing device including a dispersing nozzle that is opened and closed by an opening/closing device, an emulsion tank that stores emulsion, and an emulsion pump for pumping emulsion from the tank to the nozzle and spraying the emulsion from the nozzle. A control device controls the emulsion pump and the dispersing nozzle so that the rate of emulsion dispersion coincides with a set value. A method of dispersing emulsion using the emulsion dispersing device wherein the control device intermittently disperses the emulsion by intermittently opening and closing the opening/closing device so that the area of dispersed emulsion is continuous from front to back.

16 Claims, 4 Drawing Sheets

EMULSION DISPERSING DEVICE AND METHOD

BACKGROUND OF THE INVENTION

1. Field of the Invention

The present invention relates to an emulsion dispersing device and method which may be suitably employed in an asphalt finisher or other type of paving machine.

This application is based on patent application No. Hei 9-55564 filed in Japan, the content of which is incorporated herein by reference.

2. Description of the Related Art

When applying an asphalt mixture on top of a cement or bitumen material, an emulsion such as asphalt is typically dispersed on top of the base, in order to ensure good adhesion of the asphalt mixture thereto.

In conventional emulsion dispersing devices developed for this purpose, a dispersing nozzle which is opened and closed by an opening/closing means; an emulsion tank for storing the emulsion; an emulsion pump for sending the emulsion in the emulsion tank to the dispersing nozzle and spraying the emulsion from the nozzle in a roughly elliptical pattern; and a control device for controlling the emulsion pump; are provided to a vehicle such as an asphalt finisher. The control device control the rotating speed of the emulsion pump during dispersion of the emulsion, so that the rate of emulsion dispersion reaches a set value.

For reference, an example of the typical capacity of a conventional emulsion dispersing device follows below.

emulsion dispersing rate: 0.2~1.0 liters/m$^2$ dispersing speed from vehicle: 2~5 m/min number of dispersing nozzles: 10 diameter of dispersing nozzle: 2 mm

When dispersing small quantities of emulsion using conventional devices, however, the rotating speed of the emulsion pump is reduced and, if necessary, the dispersing nozzle is exchanged for one with a smaller diameter. In this case, however, if the rotating speed of the emulsion pump is reduced too much, then emulsion's discharge pressure drops, and the angle of dispersion of the emulsion from the nozzle becomes small. As a result, an interval of separation between the emulsion dispersed from adjacent dispersing nozzles occurs, so that a non-uniform application of the emulsion tends to result. Further, the smaller diameter dispersing nozzles tend to clog, again resulting in a non-uniform dispersion.

SUMMARY OF THE INVENTION

The present invention has as its objective the provision of an emulsion dispersing device and method capable of uniformly dispersing small quantities of emulsion.

It is another objective of the present invention to provide an emulsion dispersing device and method capable of uniformly dispersing small quantities of emulsion without reducing the rotating speed of the emulsion pump more than necessary.

It is another objective of the present invention to provide an emulsion dispersing device and method capable of uniformly dispersing a small quantity of emulsion without substituting a smaller diameter dispersing nozzle, and for which the emulsion dispersing width can be widened.

In order to achieve the above-stated objectives, the emulsion dispersing device according to the present invention provides a control device to a vehicle which is equipped with a dispersing nozzle which is opened and closed by an opening/closing means; an emulsion tank for storing the emulsion; and an emulsion pump for sending the emulsion in the emulsion tank to the dispersing nozzle and spraying the emulsion from the nozzle; the control device controlling the emulsion pump and the dispersing nozzle so that the rate of dispersion of the emulsion coincides to a set value.

The above-described emulsion dispersing device may be provided with a plurality of dispersing nozzles, aligned in a direction intersecting the vehicle's direction of movement. It is preferable to design the control device to control the amount of emulsion sent to the emulsion pump when the quantity of emulsion dispersed is greater than a limit of dispersing quantity, and to control the opening/closing means when the quantity of emulsion dispersed falls below the limit of dispersing quantity so that intermittent opening and closing of the dispersing nozzle is accomplished. It is also acceptable to provide a design in which control of the amount of emulsion sent is carried out using the rotating speed of the emulsion pump.

The emulsion dispersing method according to the present invention provides that, in an emulsion dispersing method in which an emulsion is dispersed by an emulsion dispersing device of the above design, the control device intermittently disperses the emulsion by intermittently opening and closing the opening/closing means, so that the area of dispersed emulsion is continuous from front to back.

In the case of an emulsion dispersing device having a plurality of nozzles, the opening/closing means of all of the dispersing nozzles may be opened or closed simultaneously. Alternatively, the dispersing nozzles may be divided into a plurality of groups, and the timing for opening and closing the opening/closing means may be different for each group. Note that the width of overlap between the front area of dispersed emulsion and the back area of dispersed emulsion is preferably ½ or more of the distance from the front edge to the back edge of the area of dispersed emulsion.

PREFERRED EMBODIMENTS OF THE PRESENT INVENTION

Figure 1:
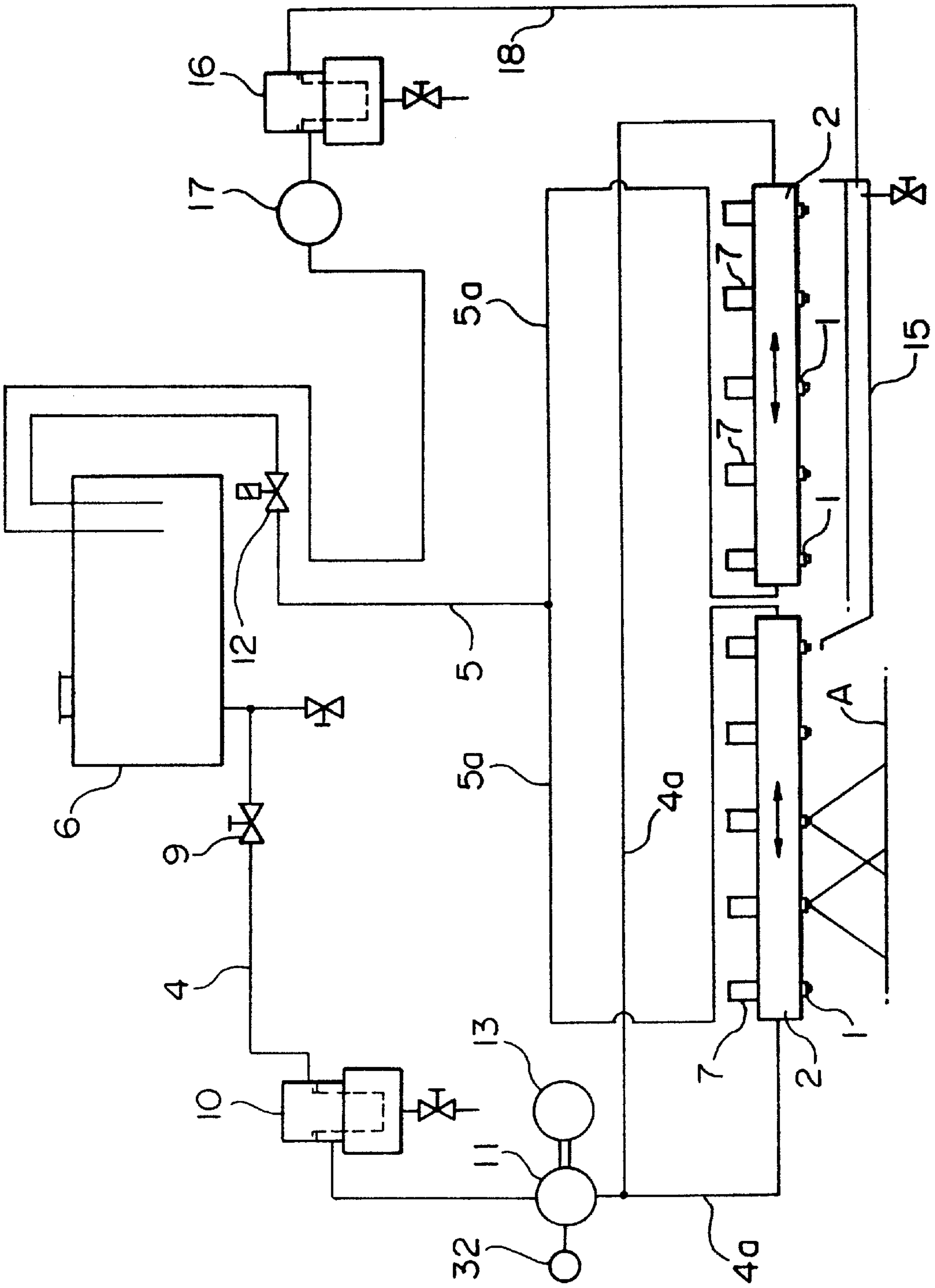
FIG. 1 shows an embodiment of an emulsion dispersing device according to the present invention.
Figure 2:
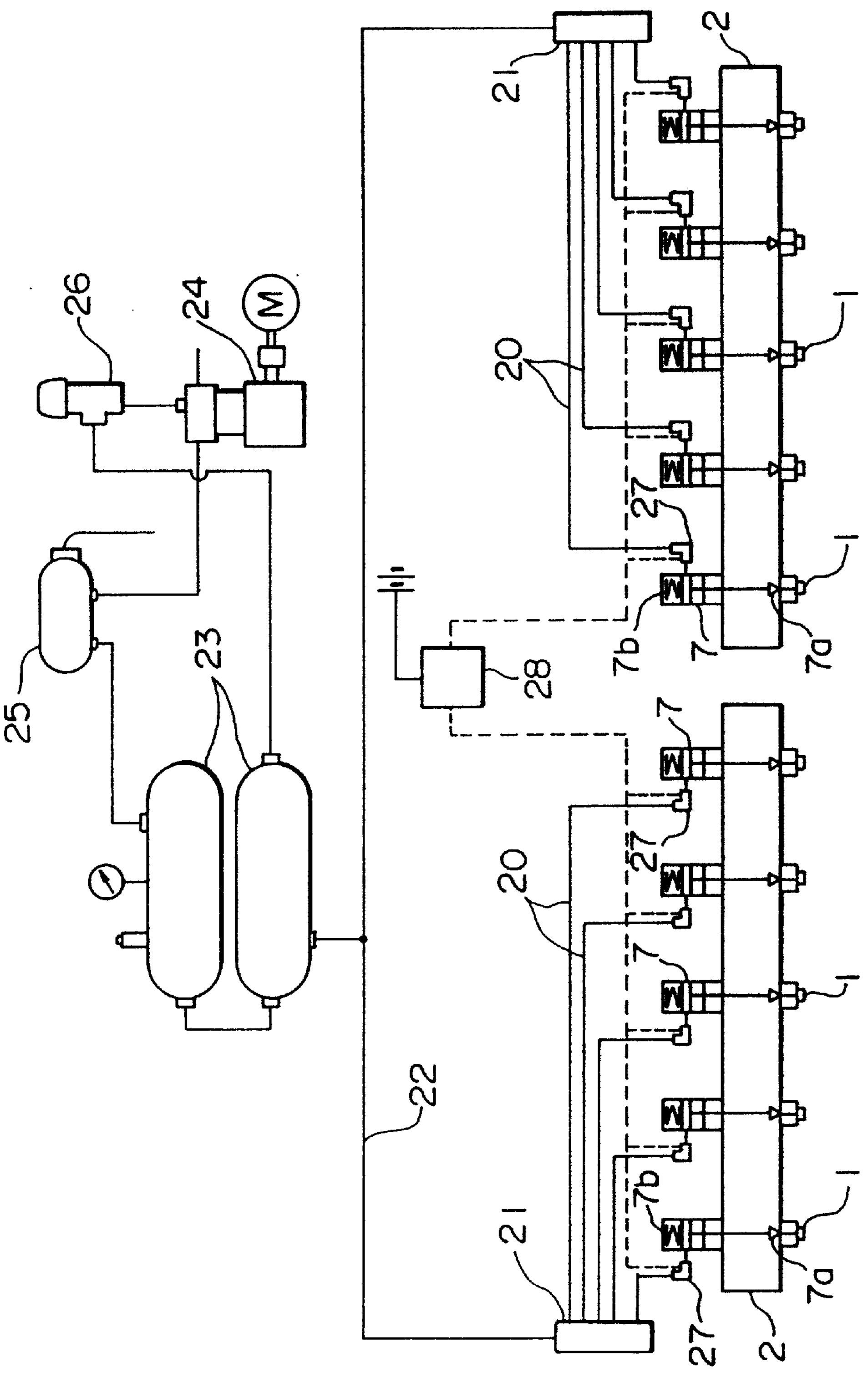
FIG. 2 shows an example of a control system for an electromagnetic switching valve in an emulsion dispersing device according to the present invention.
Figure 3:
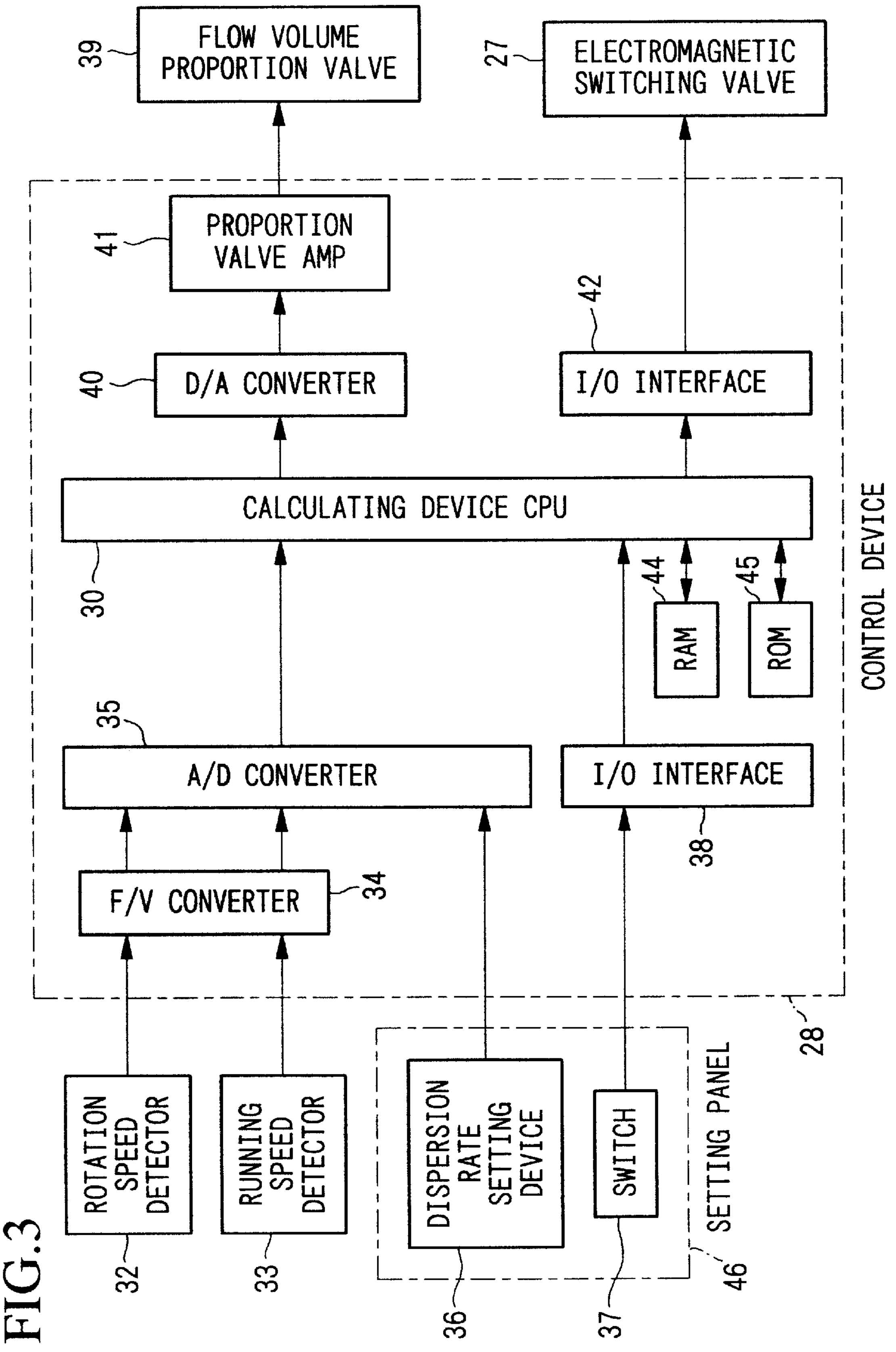
FIG. 3 shows an example of a control device in an emulsion dispersing device according to the present invention.

One preferred embodiment of the emulsion dispersing device according to the present invention is shown in FIGS. 1 through 3. The numeral 1 in the figures indicates a dispersing nozzle. Dispersing nozzle 1 disperses emulsion onto a substrate A, such as a road surface, so that the area of dispersed emulsion is roughly elliptical (for example, 100 mm×500 mm). A plurality (five in the figure) of dispersing nozzles 1 are provided equidistant along spray bars 2.

Spray bars 2 are paired members provided on the left and right, each provided to an asphalt finisher or other vehicle (not shown) so as to be freely moveable in a direction orthogonal to the direction of movement of the vehicle (perpendicular to the paper surface in FIG. 1). Spray bars 2 are disposed to the front and back, in parallel with one another, with an interval of space there between, and are connected to emulsion tank 6 via emulsion relay pipes 4,4*a* and return pipes 5,5*a*. Each dispersing nozzle has an air cylinder 7, by means of which it is opened and closed.

An opening/closing valve 9, filter 10, and emulsion pump 11 are provided to relay pipe 4 in order from upstream to downstream thereof. Electromagnetic opening/closing valve 12 is provided to return pipe 5. Emulsion pump 11 is rotated by hydraulic motor 13 (rotating drive means), relaying the emulsion in emulsion tank 6 to spray bars 2 for emission from each of dispersing nozzles 1. While the emulsion pump shown in the figure is a gear pump, the selection of this device is optional, with other emulsion pumps also applicable. Also, a piston-pump type hydraulic motor is employed in the hydraulic motor 13 shown in the figure, however, electric motors or other types of rotation driving means are also possible.

A receiving plate 15 is provided to the right side of the left spray bar 2 in FIG. 1. In order to reduce the width of dispersed emulsion, left spray bar 2 is shifted to the right, and overlaps with right spray bar 2. Receiving plate 15 is for receiving excess emulsion sprayed from dispersing nozzles on left spray bar 2 in this area of overlap. Receiving plate 15 communicates with emulsion tank 6 via suction pipe 18 which is provided with filter 16 and suction pump 17. The excess emulsion stored in receiving plate 15 may be returned to emulsion tank 6 by means of the operation of suction pump 17.

Each air cylinder 7 is connected to header 21 using air pipes 20 shown in FIG. 2. Headers 21 are connected to air tank 23 by communicating pipe 22. Air tank 23 holds compressed air sent from compressor 24 via air dryer 25. Air tank 23 is designed so that air pressure can be adjusted with air pressure adjuster 26.

Electromagnetic switching valves 27 which are turned on and off according to an electric signal from control device 28 are provided to each air pipe 20. When electromagnetic switching valve 27 is turned on, air cylinder 7 becomes smaller due to compressed air, causing valve 7*a* to rise and open dispersing nozzle 1. When electromagnetic switching valve 27 is off, air cylinder 7 becomes longer due to the effect of a spring 7*b*, so that valve 7*a* is lowered, causing dispersing nozzle 1 to close.

Air tank 23, compressor 24, and control device 28 are of course loaded on the vehicle.

Control device 28 is provided with the calculating device 30 shown in FIG. 3. Rotation speed detector 32 and running speed detector 33 are connected to calculating device 30 via F/V (frequency.pulse/voltage) converter and A/D converter 35. Additionally, dispersion rate setting device 36 is connected to calculating device 30 via A/D converter 35. Switch 37 is connected to calculating device 30 via I/O interface 38. Flow volume proportion valve 39 is connected to calculating device 30 via D/A converter 40 and comparing valve amp 41, and electromagnetic switching valve 27 is connected to calculating device 30 via I/O interface 42. In addition to the preceding, calculating device 30 may also be connected to RAM 44 and ROM 45.

Rotation speed detector 32 detects the rotation speed of emulsion pump 11. Running speed detector 33 detects the running speed of the vehicle. The device in the figure also employs a proximity sensor and is designed to output a pulse signal. A rotary encoder may also be employed, however. In addition, dispersion rate setting device (potentiometer) 36 sets the amount of emulsion dispersed per unit area (i.e., dispersing rate), and is provided to operation panel 46. Switch 37 is for starting or stopping the dispersion of the emulsion, and is also provided to operation panel 46. Flow volume proportion valve 39 is provided to the hydraulic circuit of hydraulic motor 13. By changing the amount of flow of the hydraulic fluid, the rotation speed of hydraulic motor 13 can be changed.

Calculating device 30 uses the following equation (1) to calculate the amount of emulsion which needs to be dispersed, Qn, during regular dispersion in which emulsion is continuously dispersed. In addition, calculating device 30 uses equation (2) below to calculate the rotation speed N of emulsion pump 11 at this time, and outputs a command signal to flow volume proportion valve 39. Feedback control is then exercised on the rotation speed of emulsion pump 11, based on the signal output from rotation speed detector 32.

$$Qn\ (liter/min)=S\times V(\times L) \ldots (1)$$

$$N\ (rpm)=(Qn-\alpha)/q\times\eta \ldots (2)$$

S: set emulsion dispersing rate (liter/$m^2$)

V: running (dispersing) speed (m/min)

L: dispersing width (m)

q: emulsion relay quantity per rotation of emulsion pump 11 (cc/rev)

$\alpha$: control correction offset $\eta$: pump efficiency of emulsion pump

Note that dispersing width L is a variable number in the case of an emulsion dispersing device in which there are a number of dispersing nozzles 1 which close in response to a reduction in dispersing width L. However, dispersing width L is a constant when all of the dispersing nozzles 1 are usually open, as in this embodiment.

Calculating device 30 uses the following equation (3) to calculate the time duration t during which dispersing nozzle 1 is open during intermittent dispersion of the emulsion. Calculating device 30 is designed to control the opening and closing of electromagnetic switching valve 27 by setting emulsion pump 11 to the minimum rotation speed and pressure so that the emulsion dispersing volume reaches the limit of dispersing quantity (discussed below).

$$t(ms)=Qn \times T/QL \ldots (3)$$

T: dispersion period (ms)

QL: limit of dispersing quantity (liters/min)

The limit of dispersing quantity is the amount of emulsion dispersed at the minimum rotation speed and pressure for emulsion pump 11 which does not cause operational problems such as clogging or irregular patterns of dispersion. Typically, intermittent dispersing is carried out when the required dispersing quantity Qn is less than the limit of dispersing quantity QL. Typically, control device 28 makes the determination whether dispersion is regular or intermittent. However, it is also acceptable for this determination to be made by the operator. In addition, control device 28 is also designed to determine the dispersion period T in response to the dispersing speed, etc., however, this may also be determined by the operator.

Figure 4:
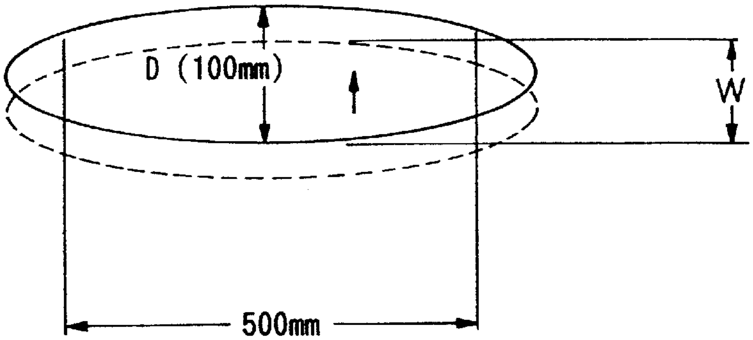
FIG. 4 shows an example of the overlap between the front and back areas of dispersed emulsion in an emulsion dispersing device according to the present invention.

After carrying out calibration in an emulsion dispersing device of the above-described capabilities, the limit of dispersing quantity QL was 19 liters/minute. According, when S=0.3, V=2, L=5, and T=600, then t=95 (ms). Further, when the front-to-back dispersing diameter (width) D of dispersing nozzle 1 is, for example, 100 mm, as shown in FIG. 4, then the width W of overlap between the front and back areas of dispersed emulsion during intermittent dispersion is about 83 mm in the above example.

When this overlap width W is set to be above ½ or more of the front-to-back width D of the dispersed emulsion, then the circular arc on the right and left edges of the dispersion surface typically overlap in the front and back, so that areas in which the emulsion fails to be dispersed do not result. Since the amount of emulsion dispersed tends to thin at the right and left edges of the dispersion surface, two dispersing nozzles 1 which are adjacent from left to right are set so that their dispersing surfaces sufficiently overlap on the left and right. Thus, it is possible to carry out an intermittent dispersion so that the pitch of the intermittent dispersion coincides with the front-to-back dispersing width D (i.e., so that the front-to-back overlap width W is zero).

Figure 5:
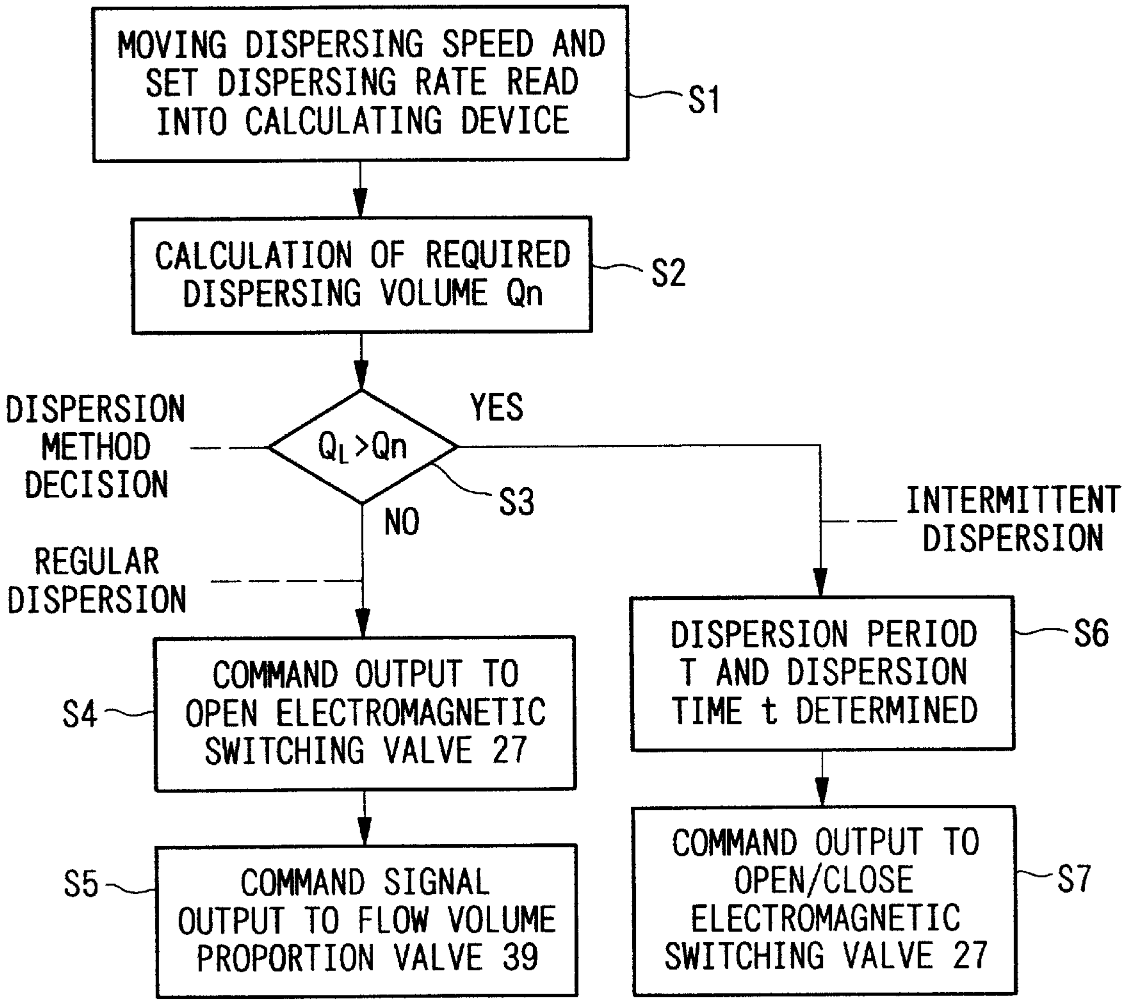
FIG. 5 is a flow chart showing one example of the operation of an emulsion dispersing device according to the present invention.

Next, the operation of an emulsion dispersing device of the above structure will be explained together with the emulsion dispersing method of the present invention, in line with the flow chart shown in FIG. 5.

Upon the start of operation, the dispersing speed when the vehicle is moving and the dispersion rate set by dispersion rate setting device 36 are read into calculating device 30 (step S1). Based on this, in step S2, calculating device 30 calculates the required dispersing quantity Qn for the emulsion using equation (1) above, and proceeds to step S3.

In step S3, the size of the predetermined limit of dispersing quantity QL and the required dispersing quantity Qn are determined. When $QL \leqq Qn$ (no), processing proceeds to step S4, and an command to open electromagnetic switching valve 27 is output. Next, in step S5, the rotation speed of emulsion pump 11 is calculated using equation (2), and a command signal is output to flow volume proportion valve 39 so that the rotating speed becomes this calculated value.

When the result in step S3 is "yes", then the dispersion period T and dispersion time t are determined. A command to open is output to electromagnetic switching valve 27 at period T, and dispersing nozzle 1 is opened for time t (step S7).

In the preceding example, when employing intermittent dispersion, all dispersing nozzles 1 are opened and closed simultaneously. However, it is also acceptable to divide the plurality of dispersing nozzles into a number of groups, and vary the timing of opening and closing of each group. In this case, it is also possible to reduce the variable width of the load on emulsion pump 11 and hydraulic motor 13. It is also acceptable to provide a design in which a portion of dispersing nozzles 1 are opened and closed in response to the dispersing width. If necessary, it is also possible to carry out intermittent dispersion when $QL \leqq Qn$. The number of dispersing nozzles 1 provided and the design thereof are optional, with a variety of modifications possible.

As explained above, in the emulsion dispersing device according to the present invention, wherein a dispersing nozzle which is opened and closed by an opening/closing means; an emulsion tank for storing the emulsion; and an emulsion pump for sending the emulsion in the emulsion tank to the dispersing nozzle and spraying the emulsion from the nozzle; are provided to a vehicle, there is provided a control device for controlling the emulsion pump and a dispersing nozzle so that the rate of emulsion dispersion reaches the set value. Accordingly, the dispersing nozzle is intermittently opened and closed, to accomplish intermittent dispersion of the emulsion. As a result, a small amount of emulsion can be uniformly dispersed, to obtain excellent adhesion as desired.

Further, when a plurality of dispersing nozzles are provided aligned in a direction so as to intersect with the vehicle's direction of movement, then it is possible to widen the dispersing width.

The control device is designed to control the amount of emulsion sent to the emulsion pump when the quantity of emulsion dispersed is greater than a limit of dispersing quantity, and to control the opening/closing means to carry out intermittent opening and closing thereof when the quantity of emulsion dispersed falls below the limit of dispersing quantity. As a result, it is possible to automatically switch between regular and intermittent dispersion of the emulsion, so that intermittent dispersion is carried out only when necessary. As a result, it is possible to know whether or not regular and intermittent dispersion are appropriate from the operation of the dispersing nozzle. Moreover, when a design is provided in which the control of the amount of emulsion relayed is performed using the rotation speed of the emulsion pump, then control of the amount of emulsion dispersed is easily accomplished.

In the emulsion dispersing method according to the present invention, in which an emulsion is dispersed by means of an emulsion dispersing device having the above-described structure, emulsion is intermittently dispersed by intermittent opening and closing of the opening/closing means by the control device, so that the dispersed emulsion is continuous from front to back. As a result, it is possible to disperse a small amount of emulsion uniformly, while obtaining excellent adhesion. Thus, it is not necessary to exchange the dispersing nozzle for one with a smaller diameter, so that workability is improved.

When a design is provided in which the opening/closing means on all of the nozzles operate simultaneously, then the control system becomes simple. Further, when a design is provided in which a plurality of dispersing nozzles are divided into a plurality of groups, and the opening/closing means thereof are operated at different times for each group, then the variable width of the load on the emulsion pump can be reduced, and its life span improved. Moreover, when the overlap width between the front and back areas of dispersed emulsion is set to be ½ or more of the width from front to back of the area of dispersed emulsion, then an improvement in the uniformity of the dispersion can be achieved, without giving rise to areas without emulsion in the curved arcs on the left and right edges.

What is claimed:

1. An emulsion dispersing device comprising:

a dispersing nozzle which is opened and closed by an opening/closing means;

an emulsion tank for storing the emulsion;

an emulsion pump for sending the emulsion in the emulsion tank to the dispersing nozzle and spraying the emulsion from the nozzle;

a vehicle for carrying the dispersing nozzle, the emulsion tank, and the emulsion pump; and a control device for controlling both the emulsion pump and the dispersing nozzle so that the rate of dispersion of the emulsion coincides to a set value;

wherein said control device controls the amount of emulsion sent to the emulsion pump when the quantity of emulsion dispersed is greater than the limit of a dispersing quantity, and said control device also controls the opening/closing means when the quantity of emulsion dispersed falls below the limit of a dispersing quantity so that intermittent opening and closing of the dispersing nozzle is accomplished.

2. An emulsion dispersing device wherein:

a dispersing nozzle which is opened and closed by an opening/closing means;

an emulsion tank for storing the emulsion; and an emulsion pump for sending the emulsion in the emulsion tank to the dispersing nozzle and spraying the emulsion from the nozzle;

a vehicle for carrying the dispersing nozzle, the emulsion tank, and the emulsion pump; and a control device for controlling both the emulsion pump and the dispersing nozzle so that the rate of dispersion of the emulsion reaches a set value;

wherein a plurality of said dispersing nozzles are provided aligned in a direction which intersects with the direction of movement of the vehicle;

and said control device controls the amount of emulsion sent to the emulsion pump when the quantity of emulsion dispersed is greater than the limit of a dispersing quantity, and said control device also controls the opening/closing means when the quantity of emulsion dispersed falls below the limit of a dispersing quantity so that intermittent opening and closing of the dispersing nozzle is accomplished.

3. An emulsion dispersing device according to claim 1, wherein the control of the amount of emulsion sent is carried out using the rotating speed of the emulsion pump.

4. An emulsion dispersing device according to claim 2, wherein the control of the amount of emulsion sent is carried out using the rotating speed of the emulsion pump.

5. An emulsion dispersing method wherein an emulsion is dispersed using the emulsion dispersing device according to claim 1, wherein the control device intermittently disperses the emulsion by intermittently opening and closing the dispersing nozzle, so that the area of dispersed emulsion is continuous from front to back.

6. An emulsion dispersing method wherein an emulsion is dispersed using the emulsion dispersing device according to claim 2, wherein the control device intermittently disperses the emulsion by intermittently opening and closing the dispersing nozzle, so that the area of dispersed emulsion is continuous from front to back.

7. An emulsion dispersing method wherein an emulsion is dispersed using the emulsion dispersing device according to claim 3, wherein the control device intermittently disperses the emulsion by intermittently opening and closing the dispersing nozzle, so that the area of dispersed emulsion is continuous from front to back.

8. An emulsion dispersing method wherein an emulsion is dispersed using the emulsion dispersing device according to claim 4, wherein the control device intermittently disperses the emulsion by intermittently opening and closing the dispersing nozzle, so that the area of dispersed emulsion is continuous from front to back.

9. An emulsion dispersing method according to claim 6, wherein the opening/closing means of all of the dispersing nozzles is opened or closed simultaneously.

10. An emulsion dispersing method according to claim 6, wherein the dispersing nozzles are divided into a plurality of groups, and the timing for opening and closing the opening/closing means is varied for each group.

11. An emulsion dispersing method according to claim 5, wherein the overlap width between the front and back areas of dispersed emulsion is set to be ½ or more of the width from front to back of the area of dispersed emulsion.

12. An emulsion dispersing method according to claim 6, wherein the overlap width between the front and back areas of dispersed emulsion is set to be ½ or more of the width from front to back of the area of dispersed emulsion.

13. An emulsion dispersing method according to claim 7, wherein the overlap width between the front and back areas of dispersed emulsion is set to be ½ or more of the width from front to back of the area of dispersed emulsion.

14. An emulsion dispersing method according to claim 8, wherein the overlap width between the front and back areas of dispersed emulsion is set to be ½ or more of the width from front to back of the area of dispersed emulsion.

15. An emulsion dispersing method according to claim 9, wherein the overlap width between the front and back areas of dispersed emulsion is set to be ½ or more of the width from front to back of the area of dispersed emulsion.

16. An emulsion dispersing method according to claim 10, wherein the overlap width between the front and back areas of dispersed emulsion is set to be ½ or more of the width from front to back of the area of dispersed emulsion.

* * * * *